United States Patent [19]
Kobayashi

[11] Patent Number: 5,305,861
[45] Date of Patent: Apr. 26, 1994

[54] INTEGRATED BACKING PLATE FOR A DRUM BRAKE

[75] Inventor: Shigeyoshi Kobayashi, Saitama, Japan

[73] Assignees: Akebono Brake Industry Co., Ltd., Tokyo; Akebono Research and Development Centre, Ltd., Hanyu, both of Japan

[21] Appl. No.: 867,434

[22] Filed: Apr. 13, 1992

[30] Foreign Application Priority Data

Apr. 15, 1991 [JP] Japan .................. 3-108101
Jan. 16, 1992 [JP] Japan .............. 4-004979[U]

[51] Int. Cl.5 ............................................. F16D 51/00
[52] U.S. Cl. .................. 188/328; 188/218 A; 188/206 A
[58] Field of Search ........ 188/218 A, 233.3, 340–341, 188/327–328, 333, 205 R, 206 R, 206 A; 29/527.5, 527.6; 164/113, 120, 47

[56] References Cited

U.S. PATENT DOCUMENTS

| | | | |
|---|---|---|---|
| 2,323,972 | 7/1943 | Brauchler | 29/527.6 |
| 4,068,645 | 1/1978 | Jenkinson | 29/527.6 X |
| 4,599,772 | 7/1986 | Graham | 29/527.5 X |
| 4,771,818 | 9/1988 | Kenney | 164/113 X |
| 5,038,898 | 8/1991 | Inoue | 188/328 |

FOREIGN PATENT DOCUMENTS

| | | |
|---|---|---|
| 0025757 | 3/1981 | European Pat. Off. . |
| 0124419 | 11/1984 | European Pat. Off. . |
| 1052756 | 3/1959 | Fed. Rep. of Germany . |
| 53-140883 | 11/1978 | Japan . |
| 55-97230 | 7/1980 | Japan . |
| 63-23034 | 1/1988 | Japan . |

*Primary Examiner*—Andres Kashnikow
*Assistant Examiner*—Josie A. Ballato
*Attorney, Agent, or Firm*—Cushman, Darby & Cushman

[57] ABSTRACT

A backing plate is formed by way of a liquid metal forging process or a die-casting process by using an aluminum alloy or an aluminum-based composite material. Essential portions to which forces are applied are formed with a large thickness, and the remaining portions with a small thickness. In addition, as another embodiment, iron pieces are embedded in portions to which forces are applied or which are liable to be worn.

4 Claims, 5 Drawing Sheets

INTEGRATED BACKING PLATE FOR A DRUM BRAKE

BACKGROUND OF THE INVENTION

1. Field of the Invention

The present invention relates to a backing plate for a drum brake used for braking an automobile or the like.

2. Related Art

Drum brakes are used extensively as brakes for automobiles, and this brake is a device for braking a wheel by causing a lining of a brake shoe to be pressed against an inner peripheral surface of a brake drum coupled with the wheel and rotating together the same, thereby braking the brake drum by means of a frictional force occurring between the two members.

The conventional drum brake is arranged as illustrated in FIGS. 1 and 2. FIG. 1 is a front elevational view of a backing plate with components mounted thereon, and FIG. 2 is a side elevational view of an anchor as viewed in the direction of II in FIG. 1.

The conventional drum brake shown in FIG. 1 as disclosed, for example, in U.S. Pat. No. 5,038,898 is provided with a backing plate 1 made of a steel plate. A brake drum 2 is superposed on the backing plate 1 in a state in which an uprightly bent edge 1a of the backing plate 1 is inserted in a groove formed in a peripheral end face of the brake drum 2. The drum brake is also provided with an axle hole 3 for insertion of an axle therethrough and one of a plurality of bolt insertion holes 4 for securing the backing plate 1 to a chassis and a hole 5 for fitting and fixing a proximal portion of a wheel cylinder 6. A brake shoe 7 is secured loosely to the backing plate by means of a hold-down device 8, and the brake shoe 7 has one end 7a engaged with an anchor 9 and the other end 7b engaged with a piston rod 6a of the wheel cylinder 6. The anchor 9 is secured to the backing plate by means of pins 9a.

Reference numerals 10 and 11 denote return springs for the brake shoes 7, and numeral 12 denotes a parking brake lever having one end pivotally secured to one of the brake shoes 7 by means of a shaft 13, a cable (not shown) guided by a cable guide 14 being connected to the other end thereof. Numeral 15 denotes a hole for insertion of the cable, and numeral 16 denotes a dust shield welded to the backing plate for preventing the entry of dust and water into the brake drum.

Since the ends 7a of the brake shoes 7 tend to float away from the backing plate 1 during braking, an arrangement is provided such that, as shown in FIG. 2, a retainer plate 9c which is larger than an anchor piece 9b is superposed on the anchor piece 9b, and these members are connected by means of the pins 9a, so as to prevent the floating of the ends 7a.

In the drum brake thus constructed, if pressure oil is supplied to the wheel cylinder 6, and the piston rod 6a is thereby pushed out, the brake shoes rotate with the anchor 9 as their fulcrum. This, in turn, causes linings 7c to be pressed against the inner peripheral surface of the brake drum 2, thereby effecting braking. If the pressure oil is discharged from the wheel cylinder 6, the brake shoes 7, 7 return to their original positions by being pulled by return springs 10, 11, thereby releasing the linings 7c from the brake drum so as to stop the braking.

FIG. 3 is a front elevational view of the conventional backing plate which is shown by omitting the wheel cylinder, brake shoes, parking brake lever, and the like. FIG. 4 is a cross-sectional view taken along the line IV—IV of FIG. 3. FIG. 5 is a cross-sectional view taken along the line V—V of FIG. 3. The entry of dust into the brake drum is stopped as the rim 1a of the backing plate 1 is fitted in the groove provided in the end face of the brake drum. However, in order to render this mechanism more reliable, an annular dust shield 16 is welded onto the outer periphery of the illustrated backing plate 1.

Thus, various components such as the wheel cylinder, anchor, brake shoes, parking brake lever, cable guide, and dust shield are mounted on the backing plate 1 and, conventionally, the backing plate is formed through a multiplicity of processes by using a steel plate, and the respective components are mounted thereon.

Although the casting of a backing plate by means of a light metal or a light alloy is described in Unexamined Japanese Utility Model Application No. Sho. 55-97230, the technique disclosed therein is such that components-fixing bolts are threadably engaged with or secured to inner portions of the backing plate to prevent the bolts from being exposed to outside the backing plate, so that it is nonanalogous art of the present invention.

Various measures for making the vehicle body lightweight have been devised to improve the performance of automobiles, but if the backing plate is formed of a steel plate, the weight unavoidably becomes large.

That is, as the backing plate, portions fringed with slant lines in FIGS. 3 and 4 need to have their strength increased, but the remaining portions do not require large strength. In the case of the backing plate made of the steel plate, however, since the thickness is uniform, the thickness cannot be changed depending on portions, so that the backing plate is provided with unnecessary weight. In addition, an attempt to make the thickness of the overall backing plate small by using a high tension steel plate has been put to practical use, but there are limits in the reduction of weight according to that method.

At the same time, in addition to press operations involving a multiplicity of processes, since the components are fixed by means of jointing processes such as welding and caulking, the number of working processes increases, the above-described method is disadvantageous in the light of the production efficiency.

SUMMARY OF THE INVENTION

The present invention was made in view of the aforementioned problems accompanying the conventional drum brake. Therefore, an object of the invention is to provide an integrated backing plate for a drum brake light in weight, and capable of reducing in the number of manufacturing processes.

Another object of the invention is to provide an integrated backing plate for a drum brake with which the casting operation is easy, and the building in of the brake shoes is also facilitated.

The above and other objects of the invention can be achieved by a provision of a backing plate for a drum brake which, in accordance with the present invention, is produced by a liquid metal forging process or a die-casting process (in this specification, these processes will be referred to as the pressurized casting process) wherein an aluminum alloy, or an aluminum-based composite material reinforced by ceramic particles and fibers and having silicon carbide (SiC) added thereto, is used to make the backing plate lightweight, and the thickness is made large only with respect to portions requiring large strength, while the thickness is reduced for portions not requiring large strength, thereby overcoming the above-described problems.

Since an aluminum alloy or an aluminum-based composite material is used, and the thickness is made large only with respect to portions requiring large strength and is made small for portions not requiring large strength, the weight of the backing plate can be reduced. At the same time, the anchor component, the dust cover, and the like, which are conventionally fabricated separately and fixed to the plate by welding, caulking, or other similar methods, are formed integrally with the backing plate, so that production can be effected efficiently.

Further, the invention may be arranged such that, by devising the configuration of embedding pieces which are embedded in the anchor against which the end portions of the brake shoes for the anchor abut, the functions of both the retainer plate and the iron pieces are provided, and the embedding pieces are embedded. The embedding piece is formed in the shape of a groove, an end of the bottom of the groove is extended and bent outwardly (in a direction away from side portions of the groove), and a hole is bored in each of the side portions. This embedding piece is embedded in the anchor instead of the conventional iron piece. The embedding piece is formed of carbon steel, stainless steel, or other tough material which is harder than an aluminum material.

In the arrangement of the invention thus produced, the embedding piece of a tough material with its end portion bent is capable of suppressing the floating of the brake shoe by virtue of its outwardly bent portion. The amount of wear is small thanks to the abutment of the end of the brake shoe against the embedding piece and the suppression of the floating. It is unnecessary to use a complicated mold when the embedding piece is embedded in the backing plate and pressurized casting is effected. Since the molten aluminum material enters the holes formed in the respective side portions and solidifies, even if the bent portion is pushed upward by the end of the brake shoe during braking, the embedding piece is reliably prevented from slipping out of the anchor, so that the end of the brake shoe can be supported favorably.

DESCRIPTION OF THE PREFERRED EMBODIMENTS

Figure 1:
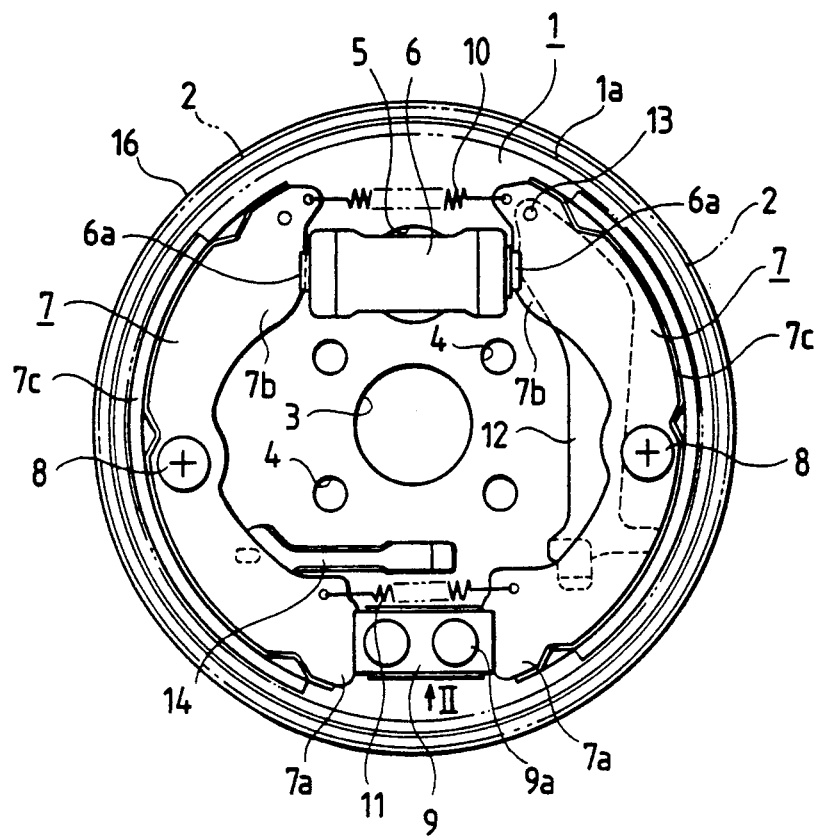
FIG. 1 is a front elevational view of a conventional backing plate made of a steel plate and having components mounted thereon.
Figure 2:
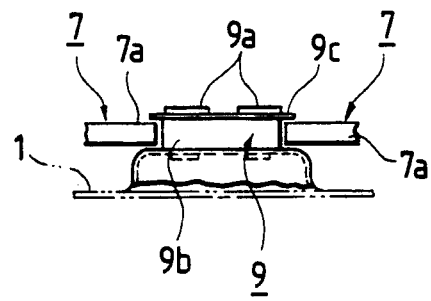
FIG. 2 is a view taken in the direction of arrow II in FIG. 1.
Figure 3:
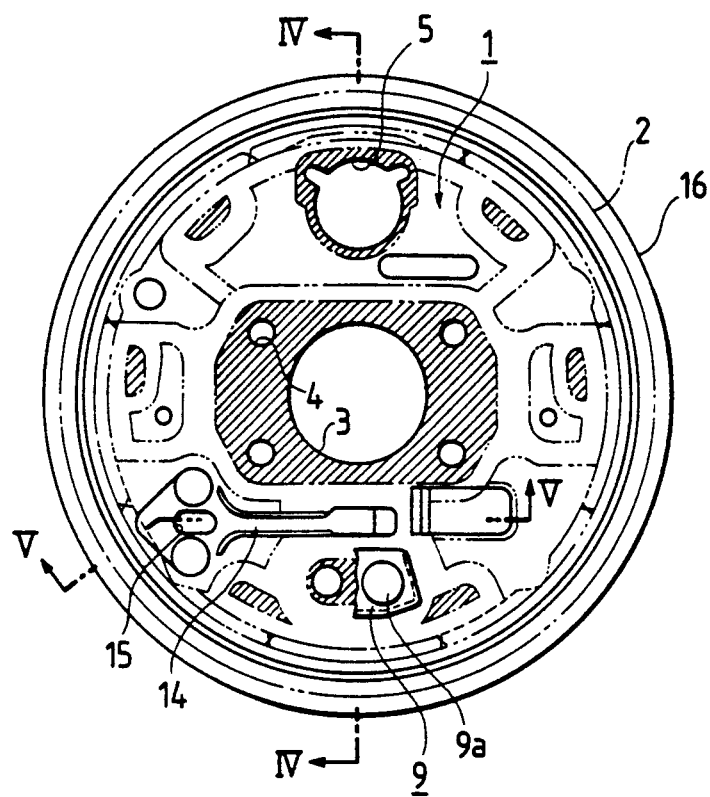
FIG. 3 is a front elevational view illustrating portions of a conventional backing plate made of a steel plate, which requires strength.
Figure 4:
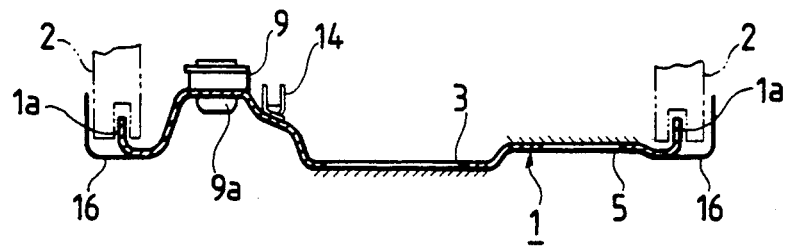
FIG. 4 is a cross-sectional view taken along the line IV—IV of FIG. 3 and illustrates portions of the backing plate requiring strength.
Figure 5:
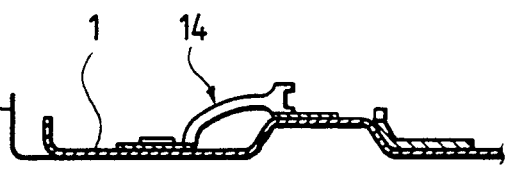
FIG. 5 is a cross-sectional view taken along the line V—V of FIG. 3 and illustrates the portions of the backing plate requiring strength.
Figure 6:
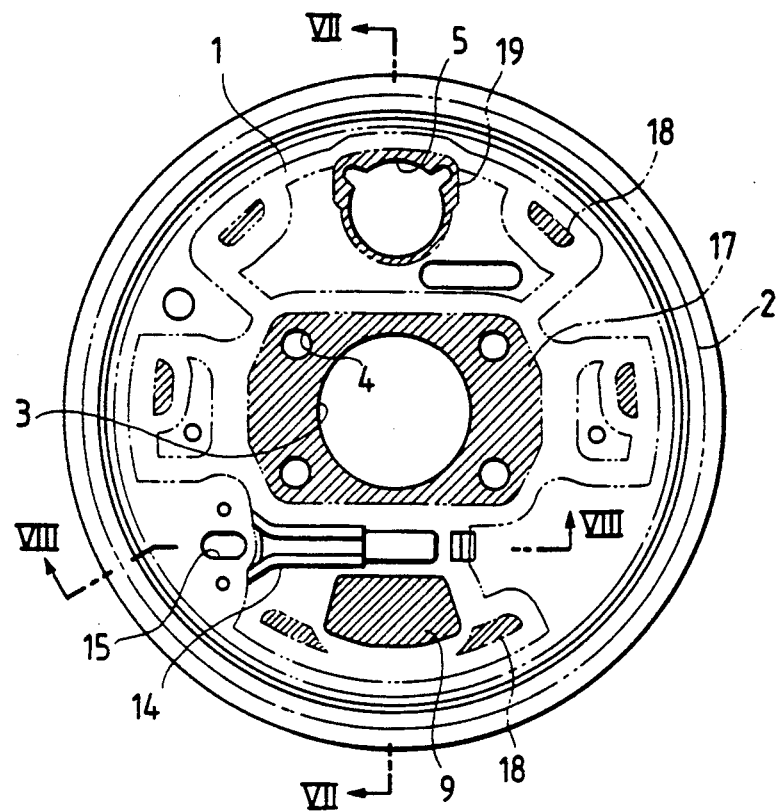
FIG. 6 is a front elevational view of a backing plate in accordance with a first embodiment.
Figure 7:
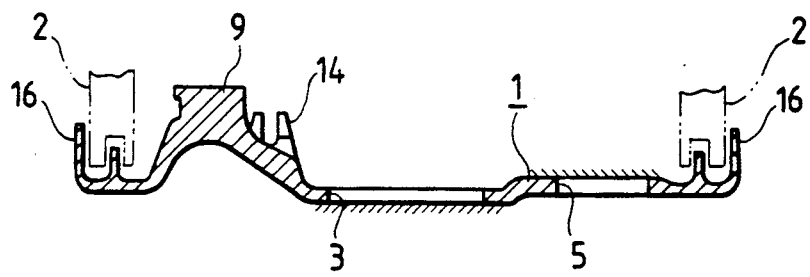
FIG. 7 is a cross-sectional view taken along the line VII—VII of FIG. 6.
Figure 8:
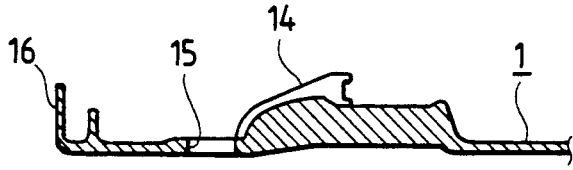
FIG. 8 is a cross-sectional view taken along the line VIII—VIII of FIG. 6.
Figure 9:
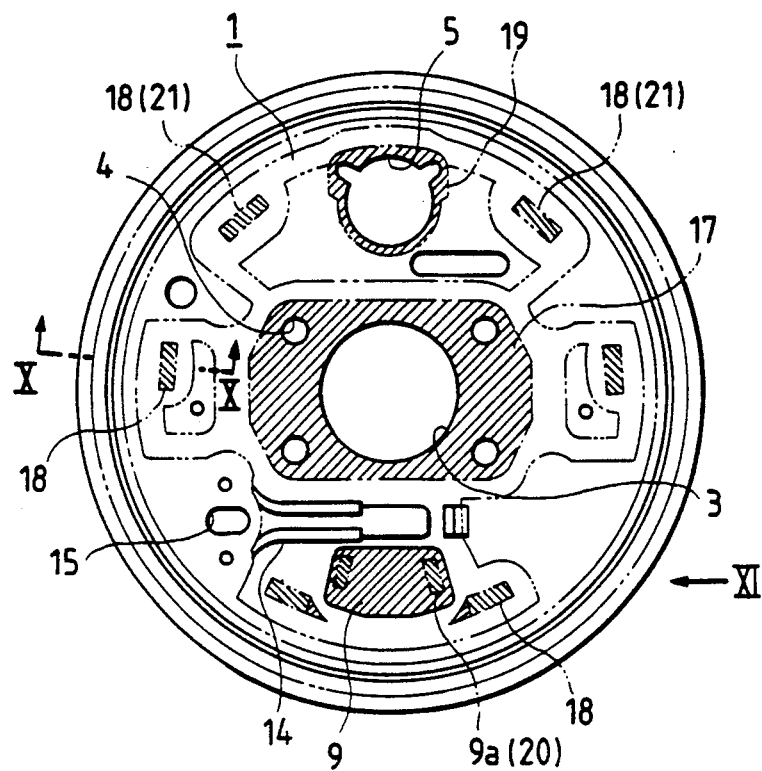
FIG. 9 is a front elevational view of a backing plate in accordance with a second embodiment.
Figure 10:
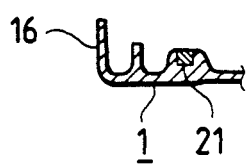
FIG. 10 is a cross-sectional view taken along the line X—X of FIG. 9.
Figure 11:
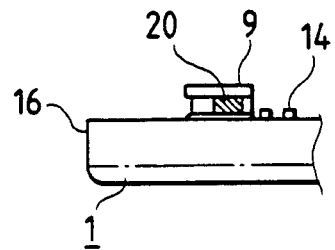
FIG. 11 is a view taken in the direction of arrow XI in FIG. 9.

FIG. 6 is a front elevational view of a backing plate showing a first embodiment of the present invention. FIG. 7 is a cross-sectional view taken along the line VII—VII of FIG. 6, and FIG. 8 is a cross-sectional view taken along the line VIII—VIII of FIG. 6. FIGS. 9 to 11 illustrate a second embodiment, in which FIG. 9 is a front elevational view of the backing plate; FIG. 10 is a cross-sectional view taken along the line X—X of FIG. 9; and FIG. 11 is a view taken in the direction of arrow XI in FIG. 9. Portions which are shown in FIGS. 6 to 11 and are equivalent to those of the prior art will be denoted by the same reference numerals, and a description thereof will be omitted.

A description will now be given of the first embodiment with reference to FIGS. 6-8.

A backing plate 1 is formed by the pressurized casting process such as a liquid metal forging process or die casting, wherein a molten aluminum alloy or an aluminum-based composite material is poured into a mold, and the material is allowed to solidify while being held under pressure.

An anchor 9, a cable guide 14, and a dust shield 16 are formed integrally with the backing plate thus formed, and a hole 3 for passing an axle therethrough, holes 4 for mounting on the chassis, a hole 5 for fixing a wheel cylinder. The thickness of portions fringed by slant lines in FIGS. 6 and 7, i.e., a peripheral portion 17 of the hole 3 for insertion of the axle, peripheral edge portions 18 on which the brake shoes slide, and a peripheral edge portion 19 of the hole 5 for fixing the wheel cylinder, is made larger than that of the remaining portions. These portions are portions where large forces are applied during braking or the brake shoes slide, resulting in large amounts of wear.

FIGS. 9-11 show an example in which reinforcement is provided by embedding iron pieces 20, 21 in portions 9a of the anchor 9 each abutting against a web of the brake shoe and in the peripheral edge portions 18 on which the brake shoes slide, these portions being liable to be worn as large forces are applied thereto. By adopting this arrangement, it is possible to reinforce the aluminum alloy or aluminum-based composite material and reduce the wear.

Figure 12:
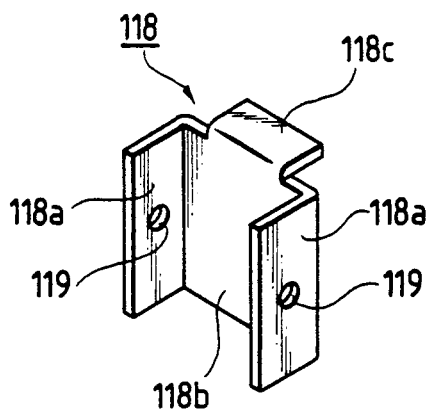
FIG. 12 is a perspective view of an embedding piece in accordance with the present invention.
Figure 13:
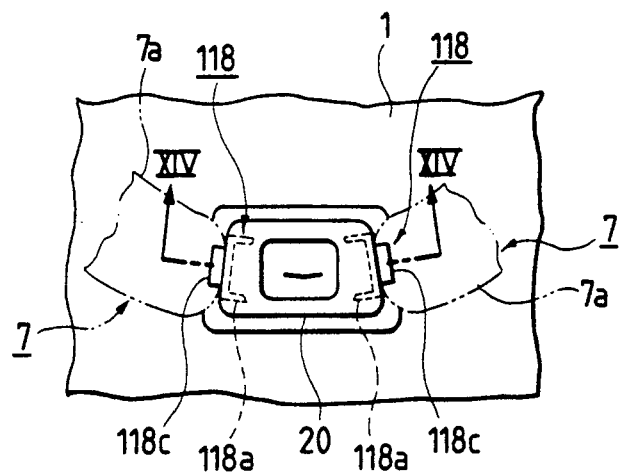
FIG. 13 is a front elevational view of an anchor portion using the embedding pieces.

FIG. 12 is a perspective view of another arrangement of an embedding piece; FIG. 13 is a front elevational view illustrating a state in which the same is embedded in an anchor portion of an integrated backing plate; and FIG. 14 is a cross-sectional view taken along the line XIV—XIV in FIG. 13.

An embedding piece 118 is formed in the shape of a groove with both side portions 118a, 118a bent upright, and a tip of a central portion 118b is bent outwardly (in a direction away from the side portions 118a) to form a bent portion 118c. A hole 119 is bored in each of the side portions 118a.

Figure 14:
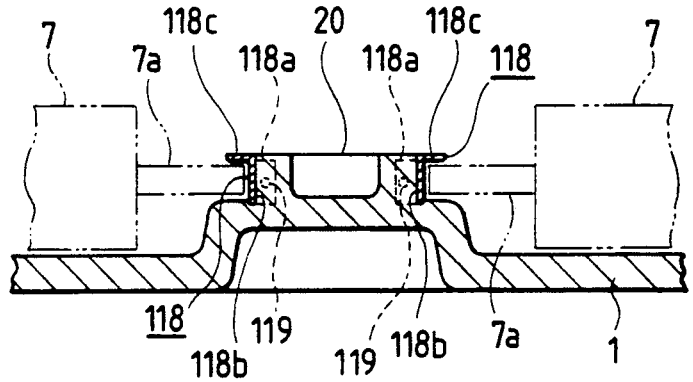
FIG. 14 is a cross-sectional view taken along the line XIV—XIV of FIG. 13.

This embedding piece is embedded in a portion of an anchor portion 20 against which the end 7a of each brake shoe abuts, as shown in FIGS. 13 and 14, when an aluminum material is cast into the backing plate 1.

The end 7a of each brake shoe is supported by a side surface of the anchor portion 20 via the embedding piece 118, as shown in FIG. 14, and even if the ends 7a of the brake shoes float during braking, the bent portion 118c holds down the same, thereby preventing the floating.

In addition, even if the embedding piece 118 tends to slip out of the anchor portion 20 by being pushed upward by this floating, since the molten aluminum enters the holes 119 in the side portions 118a and solidifies during casting, the embedding piece 118 assumes the same condition as that in which it is pinned to the anchor portion, with the result that the embedding pieces 18 are securely prevented from slipping out.

The backing plate for a drum brake according to the present invention has various advantages as described hereinbelow.

(1) Since the aluminum alloy or aluminum-based composite material is subjected to pressurized casting, essential portions can be made thick, and the remaining portions thin, thereby making it possible to render the backing plate lightweight. At the same time, it is possible to secure the rigidity, strength, and abrasion resistance which are appropriate to the drum brake.

(2) The backing plates can be produced efficiently by means of pressurized casting.

(3) Since the conventional means for such as welding and caulking are unnecessary, a substantial reduction in the number of processes is possible.

(4) The embedding piece has a simple shape, and can be readily formed of a carbon steel plate, a stainless steel plate, or the like which is not thick, so that the wear and damage of the anchor portion can be prevented.

(5) The embedding piece is embedded and cast together with the other embedding piece when a molten aluminum material is subjected to pressurized casting. There is no need to make the casting mold especially complicated, the casting operation is easy, and the building in of the brake shoes is also facilitated.

(6) Even if the embedding piece is pushed upward via the bent portion 18c by the end of the brake shoe which floats during braking, since the molten metal enters the holes 19 and functions like pins, the embedding piece is reliably prevented from slipping out.

What is claimed is:

1. An integrated backing plate for a drum brake comprising:

an anchor portion for anchoring brake shoes to the backing plate, said anchor portion having embedding pieces embedded in each side thereof against which an end of said brake shoe abuts; and a dust cover, the anchor portion and the dust cover being integrally formed with the backing plate, and being made of one of aluminum alloy and an aluminum-based composite material.

2. An integrated backing plate according to claim 1, wherein each embedding piece comprises:

two side portions connected on both sides of a central portion extending away from the central portion in a same direction so as to form a groove, each side portion having a hole bored therethrough; and an end portion extending from the central portion in a direction opposite to the extending direction of the side portions.

3. An integrated backing plate according to claim 1, wherein said aluminum-based composite material comprises:

reinforcing ceramic particles;

reinforcing ceramic fibers; and silicon carbid (SiC).

4. An integrated backing plate for a drum brake, which is fabricated by subjecting an aluminum material to pressurized casting so as to form thick portions, wherein an embedding piece is embedded in each side surface of an anchor portion against which an end of a brake shoe abuts, the embedding piece comprising:

two side portions being bent upright on both sides of a central portion forming a groove, each side portion having a hole therethrough; and and end portion of the central portion extending from the groove the end portion being bent in a direction away from the side portions to form a bent portion.

* * * * *